June 18, 1957
T. FRANZEN
2,796,153
BRAKE MECHANISM
Filed Aug. 18, 1950
2 Sheets-Sheet 1
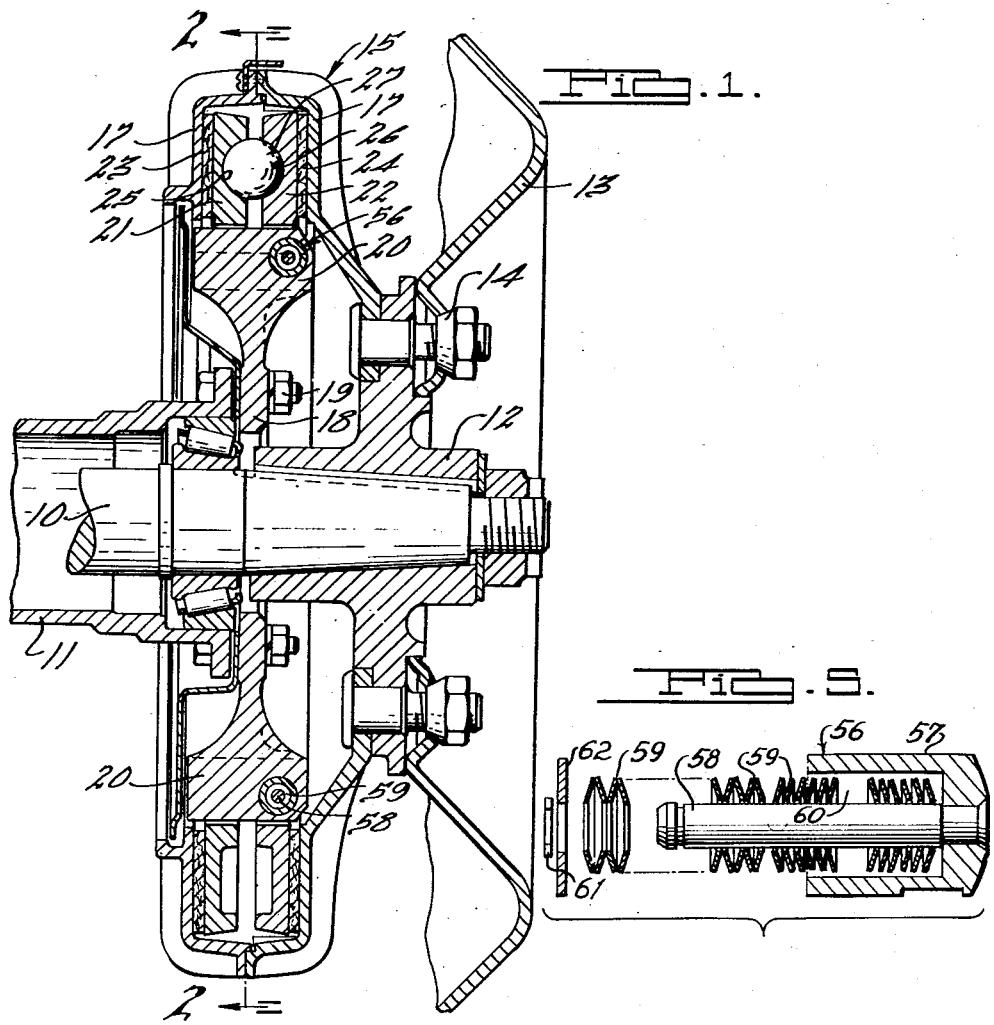
INVENTOR.
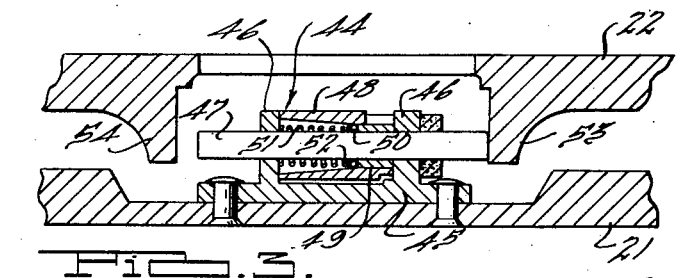
ATTORNEYS June 18, 1957  T. FRANZEN  2,796,153
BRAKE MECHANISM
Filed Aug. 18, 1950  2 Sheets-Sheet 2
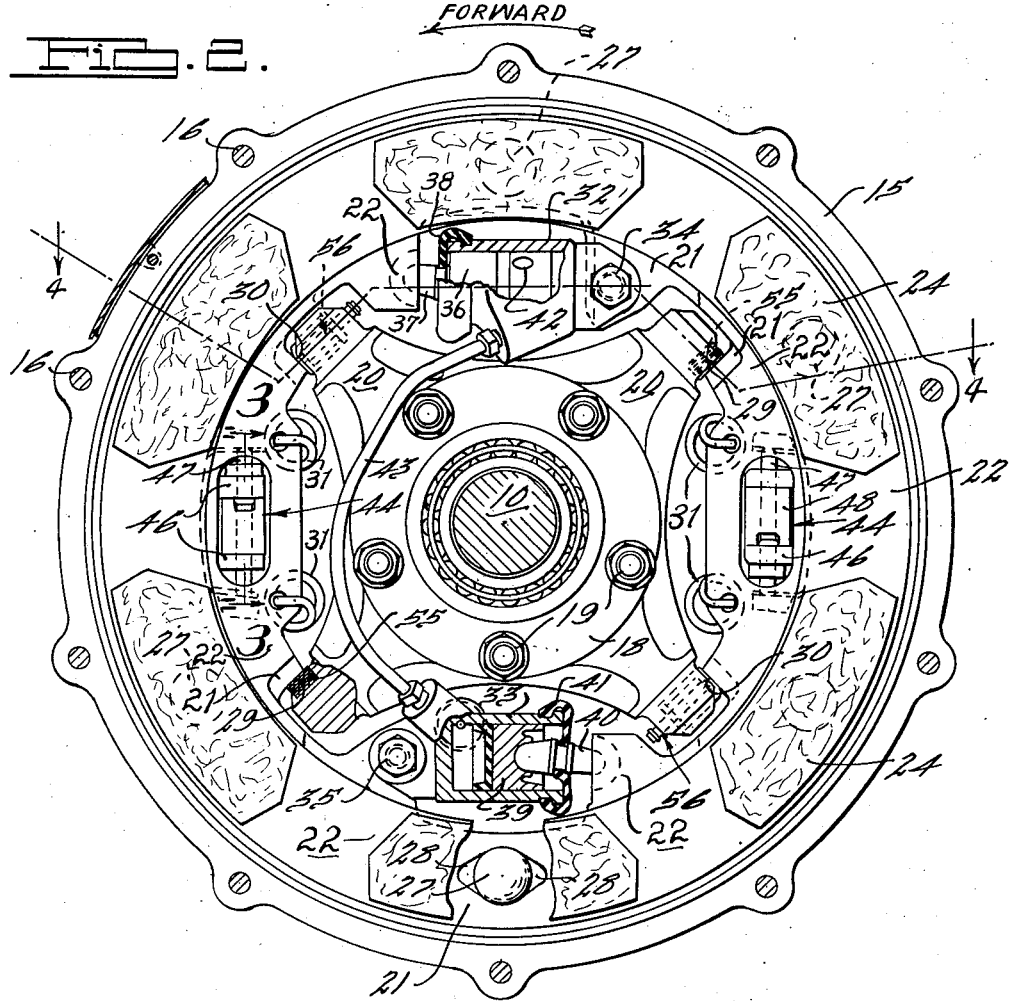
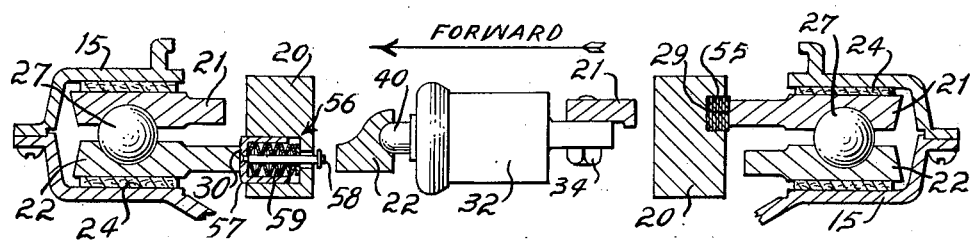
INVENTOR.
Tore Franzen.
BY Harness & Harris
ATTORNEYS.

United States Patent Office 2,796,153
Patented June 18, 1957

2,796,153

BRAKE MECHANISM

Tore Franzen, Grosse Pointe, Mich., assignor to Chrysler Corporation, Highland Park, Mich., a corporation of Delaware Application August 18, 1950, Serial No. 180,238

10 Claims. (Cl. 188—72)

This invention relates to improvements in brakes, and more particularly to a disc type brake for a road wheel of a motor vehicle or other reversely movable part to be braked.

The invention is embodied in a brake which is self-energizing in both forward and reverse braking and its main object is to provide a brake which is quiet in operation. The brake includes braking members which upon contact with the rotating member to be braked oscillate as a unit between fixed limits in response to successive forward and reverse braking. Thus, for forward braking one of the braking members acts as the secondary braking member when at one of the limits of unitary oscillation and the other braking member acts as the primary braking member and is rotated relative to the secondary braking member by contact with the rotating member to be braked, and the action of these braking members is reversed for reverse braking. Cam means acting between the braking members serves to engage the same with the member to be braked upon relative rotation between the braking members.

Oscillation of the braking members produces an objectionable noise, particularly where the member to be braked is rotating at a relative high speed and an object of the invention is to so cushion the engagement of braking members with the stop means providing the aforesaid limits as to eliminate the objectionable noise incident to such engagement.

More particularly, an object of the invention is to provide a support for the braking members by which the latter are mounted for axial movement to engage the member to be braked and which cooperates with the braking members to limit oscillation thereof between brake reaction stops, and spring means between the support and braking members for yieldably retarding unitary movement of the latter between the stop limits induced by the rotating member to be braked.

More specifically, an object of the invention is the provision of spring means which will exert a relatively high degree of retarding opposition in response to relatively small increment of movement of the braking members; and to provide such spring means in the form of cone spring disks which will exert a relatively low retarding opposition to the major part of the movement of the braking members and a maximum opposition during the final increment of movement of these members.

A further object of the invention is to utilize the aforesaid spring means for biasing the braking members to a predetermined braking position relative to the support.

Other objects and advantages of the invention will be more apparent from the following description taken in connection with the accompanying drawings in which:

Fig. 1 is a sectional, elevational view of a road wheel brake embodying the invention;

Fig. 2 is a side elevational view, partly in section, of the brake shown in Fig. 1, the view being taken substantially on the line 2—2 of Fig. 1;

Fig. 3 is an enlarged fragmentary sectional view of the adjuster, the view being taken on line 3—3 of Fig. 2;

Fig. 4 is a top plan view, mainly in section, taken on line 4—4 of Fig. 2;

Fig. 5 is an exploded view showing the spring buffer unloaded.

The invention is illustrated and described in connection with a non-steerable road wheel of a motor vehicle but is equally applicable to steerable wheels. Referring to Fig. 1, there is shown a driving axle 10, a housing 11 therefor, and a wheel including a hub 12 splined to the axle 10 and a wheel disc 13 bolted as at 14 to the hub 12. A housing 15 is bolted as at 14 to the hub 12 for rotation with the wheel and includes two sections bolted together as at 16. The housing 15 has axially opposed friction faces indicated at 17. A support 18 is bolted at 19 to the housing 11 and is in the form of a spider, having radiating arms 20.

The support 18 mounts braking members 21 and 22, each being a ring and conventionally referred to as discs and the brake referred to as a disc brake. The braking members carry friction lining segments 23 and 24 respectively which engage an adjacent friction face 17 of the housing 15 to brake the same. The members 21 and 22 have a plurality of pairs of registering recesses, one pair of such recesses being indicated at 25 and 26 respectively, each receiving a ball 27 and having a cam ramp 28 upon which the ball 27 will ride in response to relative rotation between members 21, 22 as hereafter set forth.

The inner brake member 21 has substantially diametrically opposed stop faces 29 respectively engageable with diametrically opposed arms 20 to limit rotation of member 21 in a counterclockwise direction as viewed in Fig. 2, brake torque being applied to such arms during forward braking. The outer member 22 has substantially diametrically opposed stop faces 30 respectively engageable with diametrically opposed arms 20 to limit rotation of member 22 in a clockwise direction as viewed in Fig. 2 and are the anchors for reverse braking. It will thus be understood that when the stop faces 29 are engaged with the arms 20, the member 21 is the secondary or stationary member for forward braking and the member 22 is the primary braking. The reverse is true for reverse braking where the member 22 engages its stop faces. Each member 21, 22 has circumferential clearance with the arms 20 to permit rotation of one of these members when the other stop face of the other is engaged with an arm 20.

Springs 31 urge the members 21, 22 axially together against the balls 27 thereby providing a connection between said members for unitary rotation as hereafter more fully explained. The springs will yield to permit relative axial and rotative movements between the braking members.

For rotating either braking member 21, 22 when the other is at a limit of its rotary movement, there are provided upper and lower cylinders 32 and 33 connected at 34 and 35 to the inner braking member 21. The cylinder 32 has a piston 36 connected by a rod 37 with the outer braking member 22, a seal 38 closing the open end of the cylinder. A piston 39 is positioned in the cylinder 33 and connected to the outer braking member 22 by a rod 40 which extends through a cylinder seal 41. Fluid under pressure is admitted to the upper cylinder 32, behind the piston 36, through an opening 42 and is communicated to the lower cylinder 33 by a hose line 43. The inlet opening 42 is in fluid pressure communication with the conventional master cylinder for a hydraulic brake system, such master cylinder being of the type shown in Oliver Patent 1,988,395, dated January 15, 1935.

In the operation of the brake thus far described, let it be assumed that the housing 15 will rotate in a counterclockwise direction as viewed in Fig. 2 during forward movement of the vehicle and will reversely rotate during backward or reverse movement of the vehicle. The braking member 21 is the secondary, rotatably stationary member for forward braking and is shown with each of its stop faces against an arm 20, the position which it would assume by contact with the counterclockwise rotating housing 15. Upon the application of fluid pressure the pistons 36, 39 will rotate the member 21 clockwise and the member 22 counterclockwise, as viewed in Fig. 2, and as a result of this relative rotation between these members the balls 27 will ride upon a cam ramp 28 and spread the members 21, 22 axially into contact with the counterclockwise rotating housing 15. Upon such contact the member 21 will be rotated to engage the stop faces 29 with the arms 20, as shown, and the member 22 will be rotated by the housing relative to member 21 and as a result the balls will ride further upon the ramps 28 to force the members 21, 22 into braking engagement with the housing. Upon release of fluid pressure the springs 31 will normally act to return the members to initial position.

For reverse braking, upon relative rotation of the members 21, 22, the clockwise rotating housing will force the stop faces 30 of member 22 against the arms 20 and the member 21 will be further rotated, as was the member 22 for forward braking.

Means is provided for automatically adjusting the at rest positions of the members 21, 22 to compensate for wear of the friction lining. This means, generally indicated at 44, includes a plate 45 secured to member 21 having apertured lugs 46 receiving a rod 47 which extends through a sleeve 48 having a frusto-conical inner surface, the sleeve being positioned between the lugs 46. A bushing 49 surrounds the rod 47 and has an end abutting a lug 46, a plurality of adjusting balls 50 being at the opposite end and engaging the frusto-conical surface of sleeve 48 and the surface of rod 47. A spring 51 acting between the lug 46 as an abutment and a washer 52, urges the balls 50 axially to the right as viewed in Fig. 3. The rod is positioned between two lugs 53 and 54 of the member 22. Initially the lug 53 contacts an end of the rod 47 when the brake is applied and the other end of the latter has clearance with the lug 54 which represents the clearance between the housing and a member 21, 22 when the brakes are in released position. When the brakes are applied the member 22 is in rotative relation to member 21 and lug 53 contacts the rod 47. If the brake linings are new, the linings contact the housing before the adjuster rod is pushed forward. If, however, the linings have worn, lug 53 pushes the rod through the lugs 46 until the linings contact the housing and the relative rotation of the member 21 stops. When the brakes are released the springs 31 cause the member 22 to tend to return to its former position with respect to member 21. However, when lug 54 contacts the rod 47 the balls 50 acting between sleeve and rod surfaces provides a locking action which prevents the rod 47 from being pushed back. The difference between the length of the rod 47 and the distance between the adjacent faces of lugs 53, 54 is so calculated as to provide the desired clearance between the members 21, 22 and the housing 15.

The adjuster will operate reversely for reverse braking wherein the member 21 is rotated relative to the stationary secondary braking member 22, the plate 45 shifting relative to the rod 47. Two such adjuster means are positioned at 180 degrees to each other.

The aforesaid adjustment for wear will position the members 21, 22 relative to the arms 20 so that each stop face 29, 30 will be progressively spaced from its arm 20 when the brakes are released, as adjustment for successive wear is made. However, the members 21, 22 will shift as a unit upon contact with the rotating housing to bring the stop faces 29, 30 into engagement with an arm 20. This engagement of faces 29 is cushioned by a pad 55, and the engagement of faces 30 is cushioned by an assembly 56 for each face.

Each assembly 56 includes a housing 57 having a wall at one end to which is secured one end of a pin 58 which extends through a plurality of metallic cone disked springs 59. This assembly is positioned in a large bore 60 of an arm 20 with the pin extending through an opening in the arm and projecting outwardly therefrom. A stop ring 61 is secured to the projecting end of pin 58. The springs 59 are directly compressed between the end wall of the housing 57 and a washer 62 bearing against the end wall of bore 60 and the end wall of housing 57 abuts and reacts against a stop face 30. The loaded flattened springs 59 urge the end wall of housing 57 against stop face 30 and tends to rotate member 22 and through the connection between members 21, 22 provided by the balls 27, this tendency is also imparted to member 21 to move its stop face 29 against the arms 20.

As a face 30 is progressively moved away from an arm 20, the housing 57 follows this face under the influence of the springs 59 until the stop ring 61 engages the arm 20. For reverse braking the member 22 upon contact with the rotating drum will rotate clockwise as viewed in Fig. 2 against the retarding influence of springs 59 to cushion engagement of faces 30 with arms 20 and the springs will be again loaded. Any shifting of the members 21, 22 as a unit will not disturb an adjustment made by the adjusting means.

Each spring 59 is dished in its relaxed state and the arrangement of the washers includes two sets, one set including a first group of six washers dished in one direction and a second group of six washers dished in the opposite direction, and the second set including a plurality of alternating oppositely dished springs.

This arrangement of cone dished springs permits the member 22 to move rather rapidly for the major portion of its movement as the set of alternately oppositely dished springs will flatten under a relatively light force, and the two groups of springs of the first set will offer a maximum resistance during the final increment of movement of the member 22 and thereby ease the faces 30 of the latter into engagement with the arms 22. The number of springs employed, as well as the relative arrangement thereof, can be varied as varying conditions dictate.

Thus, with the various parts positioned as illustrated in Fig. 2, each stop face 29 of disc 21 abuts the pad 55 carried by the respective adjacent spider arm 20, and each abutment face 30 of disc 22 abuts the end face of plunger 57 carried by the respective spider arm 20, the plunger 57 under the influence of springs 59 biasing the discs 21, 22 as a unit in a counterclockwise direction, as viewed in Figs. 2 and 4, to maintain the faces 29 of disc 21 against the pads 55. Upon application of fluid pressure to the wheel cylinder pistons 36, 39 the disc 21 is initially rotated in a clockwise direction, each face 29 moving away from its pad 55, and the disc 22 is initially rotated in a counterclockwise direction away from its anchor arm 20 the plunger 57 following the disc 22 due to thrust of spring 59. This rotative angular movement of discs 21, 22 causes the balls 27 to ride on disc ramps 28 and spread the discs axially apart into engagement with the housing 15. With the housing 15 rotating in a counterclockwise direction, during forward movement of the vehicle frictional engagement of the discs 21, 22 with the housing 15 rotates the discs as a unit in the direction of rotation of the housing 15, thus engaging the faces 29 of disc 21 with pads 55. Thus pressure continues to rotate the discs 22 counterclockwise to maintain the braking action. Upon relieving the fluid pressure applied force to pistons 36, 39 the spring pressed plunger 57 acts to bias the discs 21, 22 as a unit in a counterclockwise direction to engage faces 29 of disc 21 with pads 55.

As the friction linings 24 wear the automatic wear adjusting mechanism 44 will position the discs 21, 22 relatively rotatively and result in progressively increasing the distance between the faces 30 of disc 22 and the associated spider arm 20, but the spring-pressed plungers 57 will follow the disc 22, faces 30 and continue to bias the discs 21, 22 as a unit counterclockwise to engage faces 29 of discs 21 with the pads 55. This increase in the spacing of disc 22 relative to the associated spider arms 20 would result in a severe "clunk" noise when the disc 22 is rotated in a clockwise direction to engage its anchor 20 when the housing 15 is rotating in a clockwise direction for reverse drive braking. However, the springs 59 yieldably oppose this clockwise movement of disc 22 and cushion anchoring of disc 22 relative to its stop 20.

Although but one specific embodiment of the invention has herein been shown and described, it will be understood that various changes in the size, shape, and arrangement of parts may be made without departing from the spirit of the invention.

I claim:

1. In a brake for a vehicle road wheel, a member rotatable with the wheel, braking members mounted for axial movement to engage the wheel member to brake the same and for rotative movement, stops respectively operable to limit rotation of the braking members, means for rotating one of the braking members in a direction away from its stop and relative to the other braking member, means for moving said braking members axially as aforesaid in response to relative rotation therebetween, means for adjustably positioning said one member in spaced relationship with respect to its stop to compensate for wear of the engaged surfaces of said members, said one member being rotatable from an adjusted position to engage its stop under influence of engagement with the rotating wheel member, and spring means yieldably retarding rotation of said one braking member in a direction to engage its stop, said spring means including a plurality of cone dish springs arranged in first and second sets, the springs of one of said sets being relatively arranged to offer a resistance greater than the resistance offered by the springs of the other set to said rotation of said one member to engage its stop.

2. In a brake for a vehicle road wheel, a member rotatable with the wheel, braking members mounted for axial movement to engage the wheel member to brake the same and for rotative movement, stops respectively operable to limit rotation of the braking members, means for rotating one of the braking members in a direction away from its stop and relative to the other braking member, means for moving said braking members axially as aforesaid in response to relative rotation therebetween, means for adjustably positioning said one member in spaced relationship with respect to its stop to compensate for wear of the engaged surfaces of said members, said one member being rotatable from an adjusted position to engage its stop under influence of engagement with the rotating wheel member, spring means yieldably retarding rotation of said one braking member in a direction to engage its stop, said spring means including a plurality of cone dish springs arranged in first and second sets, the first set including a first plurality of successive springs dished in one direction and a cooperating second plurality of springs dished in the opposite direction, and the second set including successive springs alternately oppositely dished.

3. In a brake for a vehicle road wheel, a member rotatable with the wheel, braking members mounted for axial movement to engage the wheel member to brake the same and for rotative movement, stops respectively operable to limit rotation of the braking members, means for rotating one of the braking members in a direction away from its stop and relative to the other braking member, means for moving said braking members axially as aforesaid in response to relative rotation therebetween, means for adjustably positioning said one member in spaced relationship with respect to its stop to compensate for wear of the engaged surfaces of said members, said one member being rotatable from an adjusted position to engage its stop under influence of engagement with the rotating wheel member when said wheel member is rotating in one direction, means including the first mentioned means connecting said braking members for unitary rotative movement and accommodating said relative movement therebetween, and spring means acting between said one member and its said stop biasing said braking members rotatively as a unit in a direction to separate said one braking member from its said stop and to engage said other braking member with its said stop, said spring means retarding movement of said one member in a direction to engage its said stop under influence of engagement of said one member with the rotating wheel member when said wheel member is rotating in said one direction.

4. In a brake for a vehicle road wheel, a member rotatable with the wheel, braking members mounted for axial movement to engage the wheel member to brake the same and for rotative movement, stops respectively operable to limit rotation of the braking members, means for rotating one of the braking members in a direction away from its stop and relative to the other braking member, means for moving said braking members axially as aforesaid in response to relative rotation therebetween, means for adjustably positioning said one member in spaced relationship with respect to its stop to compensate for wear of the engaged surfaces of said members, said one member being rotatable from an adjusted position to engage its stop under influence of engagement with the rotating wheel member, means including the first mentioned means connecting said members for movement as a unit in a direction to separate said one braking member from its stop and to engage the said other braking member with its stop, a plunger element movable relative to the stop for said one member, a plurality of cone dish springs urging said plunger against said one brake member thereby to move said braking members as a unit in said one direction and resisting movement of said plunger by said one brake as the latter is moved to engage its stop by the rotating wheel brake member.

5. In a brake for a vehicle road wheel, a member rotatable with the wheel, braking members mounted for axial movement to engage the wheel member to brake the same and for rotative movement, stops respectively operable to limit rotation of the braking members, means for rotating one of the braking members in a direction away from its stop and relative to the other braking member, means for moving said braking members axially as aforesaid in response to relative rotation therebetween, said one member being rotatable to re-engage its stop under influence of engagement with the rotating wheel member, and spring means yieldably retarding rotation of said one braking member in a direction to engage its stop, the stop for said one braking member having a bore, a plunger cylinder slidable in said bore, a plurality of cone dish springs in said plunger reacting against the last mentioned stop to urge said plunger cylinder against said one braking member and acting through said plunger cylinder to retard movement of said one braking member as aforesaid to engage its stop.

6. In a brake for a vehicle road wheel, a member rotatable with the wheel, braking members mounted for axial movement to engage the wheel member to brake the same and for rotative movement, means including fluid pressure motor means for rotating one braking member in one direction relative to the other, means for moving the braking members axially as aforesaid in response to relative rotation therebetween, said one braking member being rotatable in a direction opposite said first direction under influence of engagement with the rotating wheel member, a stop limiting rotation of said one brake member in said opposite direction, a plunger slidable in said stop and engageable with said one member, and a plurality of cone dish springs acting between said plunger and said stop yieldably retarding rotation of said one brake member in said opposite direction.

7. In a brake for a vehicle road wheel, a member rotatable with the wheel, braking members mounted for axial movement to engage the wheel member to brake the same and for rotative movement, stops respectively operable to limit rotation of the braking members, means for rotating one of the braking members in a direction away from its stop and relative to the other braking member, means for moving said braking members axially as aforesaid in response to relative rotation therebetween, means including said moving means connecting said braking members together for movement as a unit in a direction to engage said one member with its stop in response to engagement of said one member with the rotating wheel member when the latter is rotating in one direction, and spring means yieldably retarding said unitary movement of said braking members in the direction to engage said one braking member with its stop.

8. In a brake for a vehicle road wheel, a member rotatable with the wheel, braking members mounted for axial movement to engage the wheel member to brake the same and for rotative movement, spring means connecting said members together for unitary rotation and yieldable to accommodate their relative movement, stops respectively operable to limit rotation of the braking members, means for rotating one of the braking members in a direction away from its stop and relative to the other braking member, means for moving said braking members axially as aforesaid in response to relative rotation therebetween, means for adjustably positioning said one braking member in spaced relationship with respect to its stop to compensate for wear of the engaged surfaces of said braking members, said braking members being rotatable as a unit in a direction to rotate said one braking member from an adjusted position to engage its stop under influence of engagement with the rotating wheel member, and spring means other than the first mentioned spring means yieldably retarding unitary rotation of said braking members in a direction to engage said one braking member with its stop to thereby cushion engagement of said one member with its stop.

9. In a brake for a vehicle road wheel, a member rotatable with the wheel, braking members mounted for axial movement to engage the wheel member to brake the same and for rotative movement, spring means connecting said members together and yieldable to accommodate their relative movement, stops respectively operable to limit rotation of the braking members, means including a chamber receiving fluid under pressure for rotating one of the braking members in a direction away from its stop and relative to the other braking member, means for moving said braking members axially as aforesaid in response to relative rotation therebetween, means for adjustably positioning said one member in spaced relationship with respect to its stop to compensate for wear of the engaged surfaces of said braking members, said braking members being rotatable as a unit in a direction to rotate said one braking member from an adjusted position to engage its stop under influence of engagement with the rotating wheel member, and a spring actuated plunger disposed exteriorally of said chamber and acting on one of said members yieldably retarding unitary rotation of said braking members in a direction to engage said one braking member with its stop to thereby cushion said engagement, and said plunger biasing said braking members rotatively as a unit in a direction to engage the other of said braking members with its stop when said braking members are free from engagement with said rotating member.

10. In a brake for a vehicle road wheel, a member rotatable with the wheel, braking members mounted for axial movement to engage the wheel member to brake the same and for relative rotative movement, said braking members being connected together for unitary rotation, stops respectively operable to limit unitary rotation of the braking members, means for rotating one of the braking members in a direction away from its stop and relative to the other braking member, means for moving said braking members axially as aforesaid in response to relative rotation therebetween, said one braking member being rotatable to re-engage its stop in response to unitary rotation of the braking members under influence of engagement with the rotating wheel member, and spring means including a plurality of cone dished springs constituting the sole means for yieldably retarding unitary rotation of said braking members in a direction to engage said one braking member with its stop, said spring means biasing said braking members as a unit in a direction to engage the other of said braking members with its stop when said braking members are free from said engagement with said rotatable wheel member.

References Cited in the file of this patent

UNITED STATES PATENTS

| Number | Name | Date |
|---|---|---|
| 65,790 | Belleville | June 18, 1867 |
| 1,824,332 | Davidson et al. | Sept. 22, 1931 |
| 1,988,395 | Oliver | Jan. 15, 1935 |
| 2,526,149 | Meyers et al. | Oct. 17, 1950 |
| 2,575,963 | Kershner | Nov. 20, 1951 |
| 2,595,859 | Lambert et al. | May 6, 1952 |
| 2,633,943 | Lambert | Apr. 7, 1953 |
| 2,731,114 | Lambert et al. | Jan. 17, 1956 |
| 2,732,036 | Myers | Jan. 24, 1956 |

FOREIGN PATENTS

| Number | Country | Date |
|---|---|---|
| 872,627 | France | June 15, 1942 |
| 232,251 | Switzerland | Aug. 1, 1944 |

OTHER REFERENCES

Automotive Industries, page 37, Sept. 15, 1949.